United States Patent
Ha et al.

(10) Patent No.: US 8,996,404 B2
(45) Date of Patent: Mar. 31, 2015

(54) METHOD FOR PROCESSING INVALID CLICK AND SYSTEM FOR EXECUTING THE METHOD

(75) Inventors: Jung Soo Ha, Yongin-si (KR); Wu Sic Wee, Yongin-si (KR); Minuk Kim, Seoul (KR)

(73) Assignee: NHN Business Platform Corporation, Seongnam-si (KR)

( * ) Notice: Subject to any disclaimer, the term of this patent is extended or adjusted under 35 U.S.C. 154(b) by 1039 days.

(21) Appl. No.: 12/597,395

(22) PCT Filed: Mar. 14, 2008

(86) PCT No.: PCT/KR2008/001431
§ 371 (c)(1),
(2), (4) Date: Oct. 23, 2009

(87) PCT Pub. No.: WO2008/133404
PCT Pub. Date: Nov. 6, 2008

(65) Prior Publication Data
US 2010/0131353 A1    May 27, 2010

(30) Foreign Application Priority Data
Apr. 26, 2007 (KR) .......................... 10-2007-0040784

(51) Int. Cl.
*G06Q 30/00* (2012.01)
*G06Q 30/02* (2012.01)

(52) U.S. Cl.
CPC ............ *G06Q 30/02* (2013.01); *G06Q 30/0243* (2013.01); *G06Q 30/0277* (2013.01); *G06Q 30/0257* (2013.01)
USPC ...................................... 705/14.47; 705/14.4

(58) Field of Classification Search
None
See application file for complete search history.

(56) References Cited

U.S. PATENT DOCUMENTS

| | | | |
|---|---|---|---|
| 7,657,626 B1 * | 2/2010 | Zwicky | 709/224 |
| 2006/0136294 A1 * | 6/2006 | Linden et al. | 705/14 |
| 2007/0239541 A1 * | 10/2007 | Kane et al. | 705/14 |
| 2008/0109553 A1 * | 5/2008 | Fowler | 709/229 |
| 2008/0114624 A1 * | 5/2008 | Kitts | 705/7 |
| 2008/0162200 A1 * | 7/2008 | O'Sullivan et al. | 705/7 |
| 2008/0201214 A1 * | 8/2008 | Aaron et al. | 705/14 |
| 2008/0270154 A1 * | 10/2008 | Klots et al. | 705/1 |

(Continued)

FOREIGN PATENT DOCUMENTS

| | | |
|---|---|---|
| CN | 1761961 | 4/2006 |
| JP | 2002-245339 | 8/2002 |

(Continued)

*Primary Examiner* — Matthew T Sittner
(74) *Attorney, Agent, or Firm* — Greer Burns & Crain Ltd.

(57) ABSTRACT

A method and system of processing an invalid click is provided. The method includes the steps of: verifying an invalid click Internet Protocol (IP) address of a user terminal generating the invalid click with respect to an advertisement; associating the invalid click IP address with the advertisement, and registering and maintaining the invalid click IP address in an invalid click list when the invalid click IP address is verified; and providing the user terminal of the invalid click IP address with a result page other than the advertisement with respect to an advertisement exposure request using the invalid click IP address. When a number of clicks is greater than or equal to a predetermined number of clicks with respect to the same advertisement using the same IP address over a predetermined time, the step of verifying verifies the same IP address as the invalid click IP address.

7 Claims, 6 Drawing Sheets

(56) References Cited

U.S. PATENT DOCUMENTS

2010/0205059 A1* 8/2010 Yehoshua et al. .......... 705/14.55
2012/0084146 A1* 4/2012 Zwicky ..................... 705/14.47

FOREIGN PATENT DOCUMENTS

| | | |
|---|---|---|
| KR | 10-2003-0055695 | 7/2003 |
| KR | 10-2004-0082633 | 9/2004 |
| KR | 10-0462828 | 12/2004 |
| KR | 10-0483025 | 4/2005 |
| KR | 10-2005-0055851 | 6/2005 |
| KR | 10-2005-0058172 | 6/2005 |
| KR | 10-2006-0013478 | 2/2006 |
| KR | 10-2007-0027851 | 3/2007 |
| WO | 2004/084097 | 9/2004 |

* cited by examiner

METHOD FOR PROCESSING INVALID CLICK AND SYSTEM FOR EXECUTING THE METHOD

CROSS-REFERENCE TO RELATED APPLICATIONS

This application is the National Stage of International Application No. PCT/KR2008/001431, filed Mar. 14, 2008, and claims priority from and the benefit of Korean Patent Application No. 10-2007-0040784, filed on Apr. 26, 2007, which are both hereby incorporated by reference for all purposes as if fully set forth herein.

BACKGROUND OF THE INVENTION

1. Field of the Invention

The present invention relates to a method of processing an invalid click, and a system for executing the method, and more particularly, to a method and system of processing an invalid click by not exposing an object of the invalid click to a user terminal of an Internet Protocol (IP) address generating the invalid click.

2. Discussion of the Background

A Cost Per Click (CPC) advertisement calculates an advertising cost based on a click of a hypertext, the click denoting a visit of an Internet user in a web site list being ordered and being indicated based on a bidding price. However, the above-described CPC scheme has a serious problem, that is, 'an invalid click' (or 'a fraudulent click') causing an advertiser to unnecessarily expend costs.

Specifically, since the CPC scheme charges based on an advertising effect, the CPC scheme is used as a charging scheme currently most favored by advertisers different from an existing charging scheme based on exposure, however, the CPC scheme has a problem that the advertising effect may be induced by intentionally repeating the click. Since the invalid click is a serious hazard of ruining a basis of a CPC charging system, many enterprises construct a system for preventing the invalid click, however, preventing 100% of the invalid clicks is difficult.

As described above, a conventional art with respect to a CPC advertisement has an inefficient problem that a cost needs to be paid for a plurality of unintentional clicks of a search user or a malicious click of the same person.

SUMMARY OF THE INVENTION

The present invention provides a new technology with respect to a method of processing an invalid click and a system for executing the method.

The present invention also provides a method and system of processing an invalid click which can intercept the invalid click in advance by verifying an Internet Protocol (IP) address of a user terminal generating the invalid click with respect to a random advertisement, associating the IP address as an invalid click IP address with the advertisement, registering and maintaining the IP address, and not exposing the advertisement with respect to a subsequent advertisement exposure request using the invalid click IP address.

The present invention also provides a method and system of processing an invalid click which can intercept the invalid click by associating an interception request IP address inputted from an advertiser with an advertisement of the advertiser, registering and maintaining the interception request IP address, and not exposing the advertisement with respect to an advertisement exposure request using the interception request IP address.

The present invention also provides a method and system of processing an invalid click which can provide a result page with respect to an advertisement exposure request by substituting an advertisement of which exposure is restricted based on either an invalid click IP address or an interception request IP address, with a next rank advertisement based on an advertisement exposure rank.

According to an aspect of the present invention, there is provided a method of processing an invalid click, the method including the steps of: verifying an invalid click Internet Protocol (IP) address of a user terminal generating the invalid click with respect to an advertisement; associating the invalid click IP address with the advertisement, and registering and maintaining the invalid click IP address in an invalid click list when the invalid click IP address is verified; and providing the user terminal of the invalid click IP address with a result page other than the advertisement with respect to an advertisement exposure request using the invalid click IP address.

In an aspect of the present invention, when a number of clicks is greater than or equal to a predetermined number of clicks with respect to the same advertisement using the same IP address over a predetermined time, the step of verifying verifies the same IP address as the invalid click IP address.

In an aspect of the present invention, the step of providing includes the steps of: generating the result page with respect to the advertisement exposure request; searching for an IP address of the user terminal transmitting the advertisement exposure request in the invalid click list; verifying the advertisement being associated with the IP address and being registered when the IP address exists in the invalid click list; and excluding the advertisement from the result page and transmitting the result page to the user terminal.

In an aspect of the present invention, the step of excluding and transmitting includes the steps of: verifying whether the advertisement exists in the result page; adding a next rank advertisement based on an advertisement exposure rank other than the advertisement to the result page when the advertisement exists; and transmitting the result page to the user terminal.

According to another aspect of the present invention, there is provided a method of processing an invalid click, the method including the steps of: receiving an interception request IP address from an advertiser; associating the interception request IP address with an advertisement of the advertiser, and registering and maintaining the interception request IP address in an invalid click list; and providing a result page other than the advertisement with respect to an advertisement exposure request using the interception request IP address. In this instance, the step of providing includes the steps of: generating the result page with respect to the advertisement exposure request; searching for an IP address of a user terminal transmitting the advertisement exposure request in the invalid click list; verifying the advertisement being associated with the IP address and being registered when the IP address exists in the invalid click list; and excluding the advertisement from the result page and transmitting the result page to the user terminal.

DETAILED DESCRIPTION OF THE ILLUSTRATED EMBODIMENTS

Figure 1:
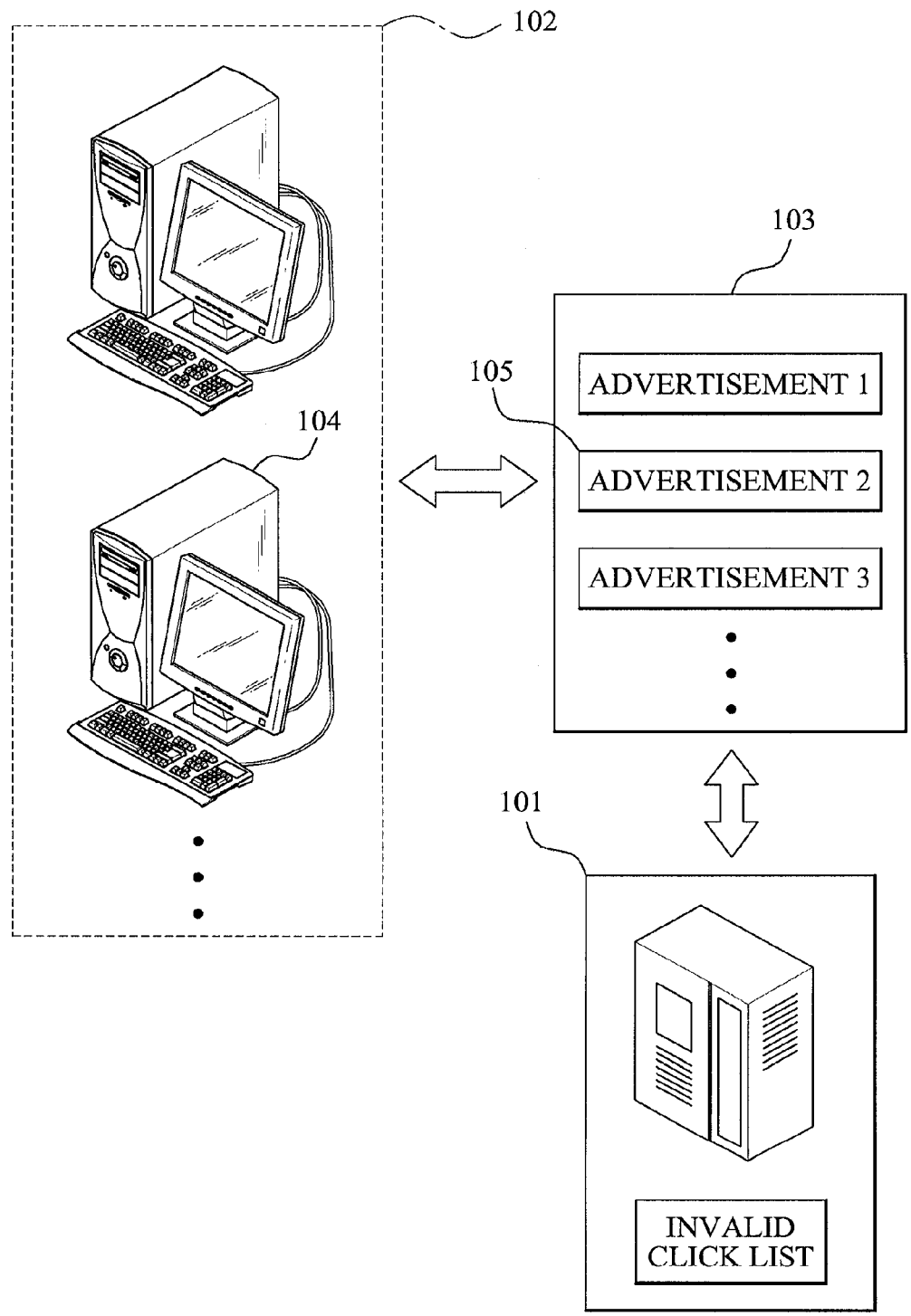
FIG. 1 illustrates an example configuration for describing an overview of an invalid click processing system according to an exemplary embodiment of the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

FIG. 1 illustrates an example configuration for describing an overview of an invalid click processing system 101 according to an exemplary embodiment of the present invention.

As described above, an invalid click denotes a click with respect to an action of intentionally repeating the click with respect to the same advertisement. As a first method, when a single user terminal 104 continuously repeats the click with respect to the same advertisement 105 when a plurality of user terminals 102 accesses an advertisement list page 103, the invalid click processing system 101 verifies an Internet Protocol (IP) address of the user terminal 104, associates the IP address with an advertisement 105, and stores the IP address in an invalid click list in order to process the invalid click.

Specifically, since the invalid click list associates an invalid click IP address such as the IP address with the advertisement 105 being an object of the invalid click with respect to the invalid click IP address and stores the invalid click IP address, the invalid click with respect to the advertisement 105 may be intercepted in advance by excluding the advertisement 105 when an advertisement exposure request from the invalid click IP address subsequently occurs.

A second method receives an IP address requested by an advertiser to be intercepted as an interception request IP address, associates the interception request IP address with the advertisement of the advertiser, and maintains the interception request IP address in the invalid click list, thereby intercepting the invalid click from the interception request IP address in advance, similar to the first method.

The first method with respect to the above-described method and system of processing the invalid click is described in detail with reference to FIG. 2, FIG. 3, and FIG. 4, and the second method is described in detail with reference to FIG. 5 and FIG. 6.

Figure 2:
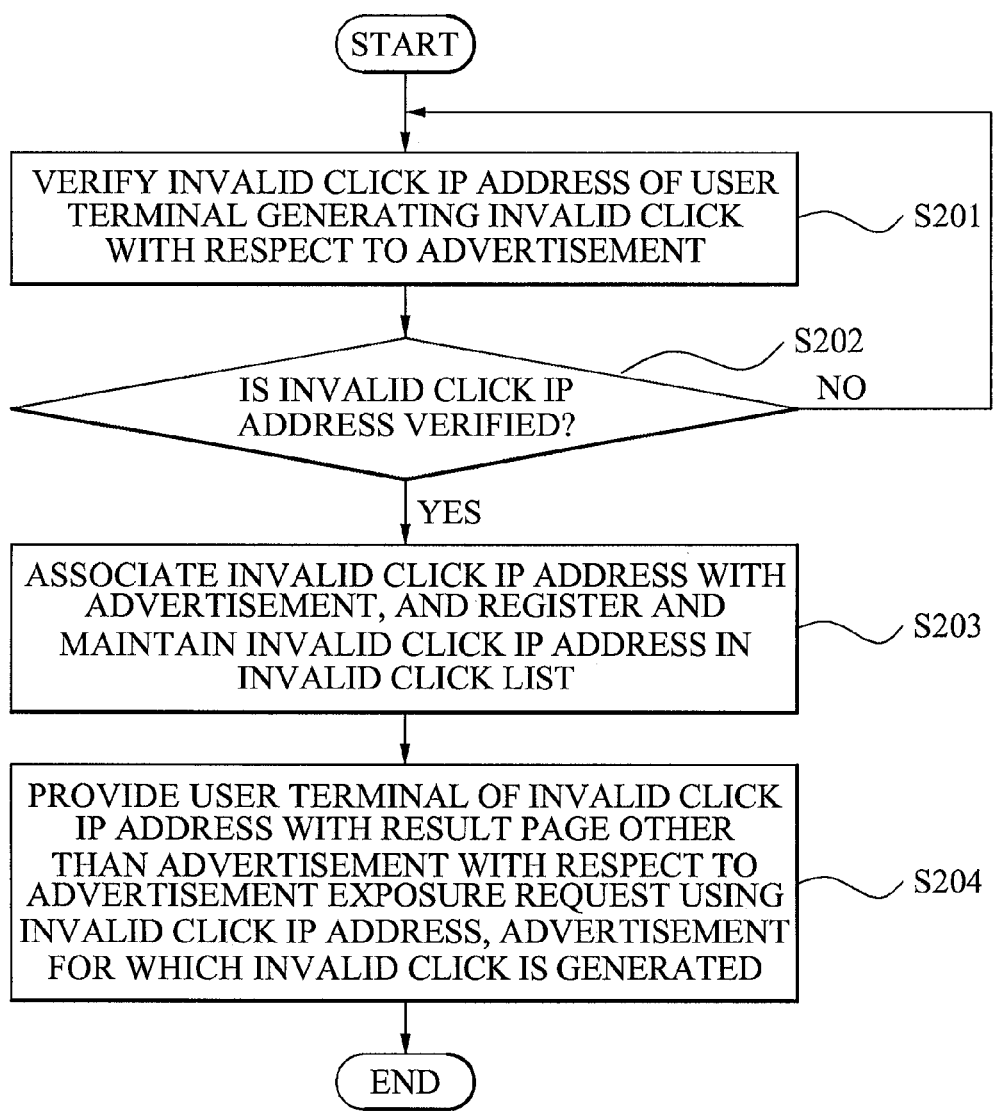
FIG. 2 is a flowchart illustrating a method of processing an invalid click according to a first exemplary embodiment of the present invention.

FIG. 2 is a flowchart illustrating a method of processing an invalid click according to a first exemplary embodiment of the present invention.

In operation S201, an invalid click processing system verifies an invalid click IP address of a user terminal generating the invalid click with respect to an advertisement. When a number of clicks is greater than or equal to a predetermined number of clicks with respect to the same advertisement using the same IP address over a predetermined time, the invalid click processing system verifies the same IP address as the invalid click IP address in order to verify the invalid click IP address.

In operation S202, when the invalid click IP address is verified, the invalid click processing system performs operation S203, and when the invalid click IP address is not verified, the invalid click processing system performs operation S201. Specifically, the invalid click processing system may continuously detect the invalid click with respect to the advertisement using operation S201 and operation S202. For example, the invalid click processing system may verify whether the same advertisement is clicked at the number of clicks, using the same IP address for a current period, and verify this for each time, thereby continuously verifying whether the invalid click is generated.

In operation S203, the invalid click processing system associates the invalid click IP address with the advertisement, and registers and maintains the invalid click IP address in an invalid click list when the invalid click IP address is verified. This is for intercepting the invalid click with respect to the advertisement in advance by excluding the advertisement when the user terminal using the invalid click IP address subsequently requests exposure of the advertisement, and is described in detail using operation S204.

In operation S204, the invalid click processing system provides the user terminal of the invalid click IP address with a result page other than the advertisement with respect to an advertisement exposure request using the invalid click IP address. Specifically, the invalid click processing system may not expose the advertisement being the object of the invalid click with respect to the advertisement exposure request using the invalid click IP address, and the above-described method is described in detail with reference to FIG. 3.

Figure 3:
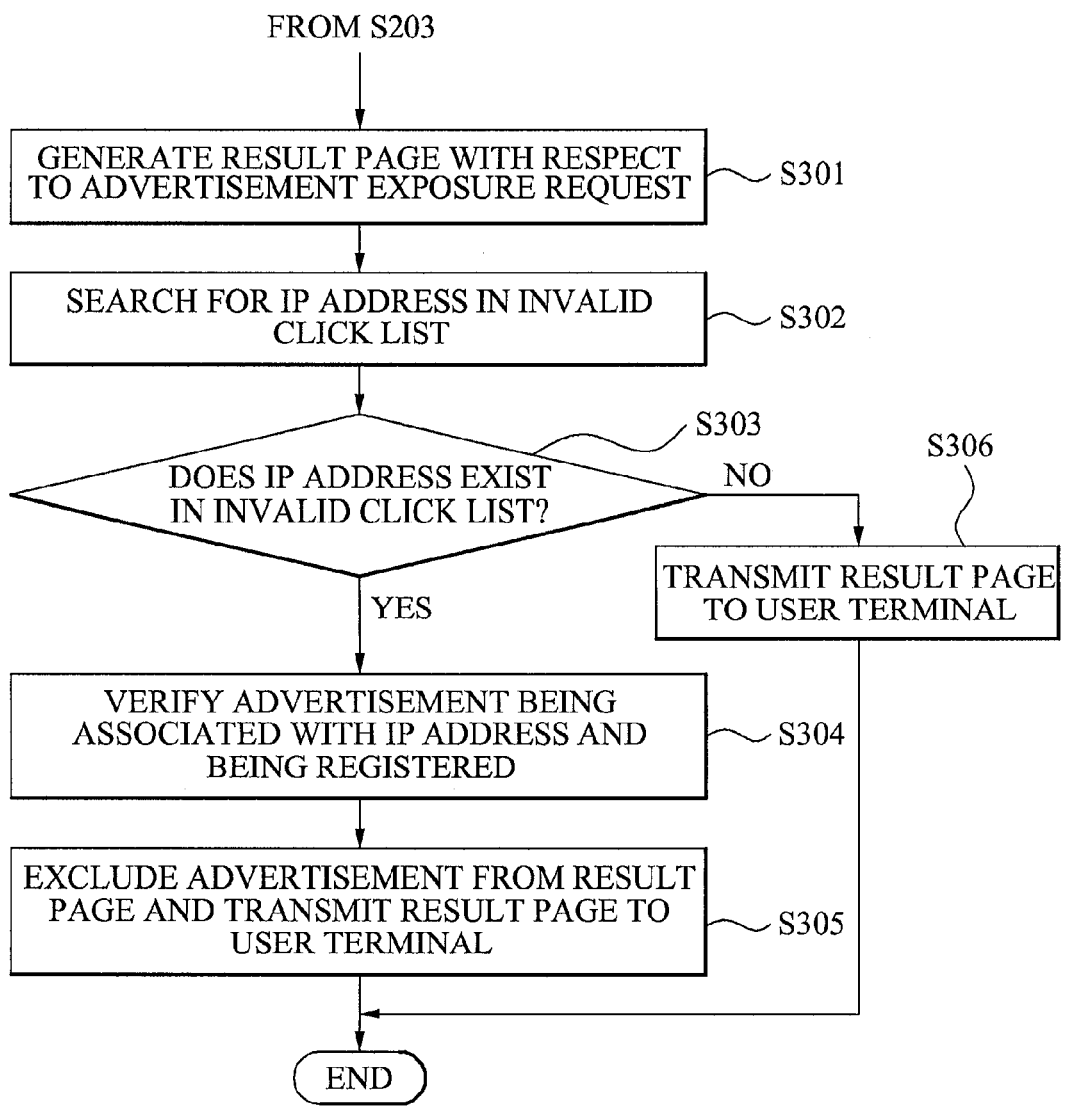
FIG. 3 is a flowchart illustrating a method of providing a result page other than an advertisement for which an invalid click is generated according to the first exemplary embodiment of the present invention.

FIG. 3 is a flowchart illustrating a method of providing a result page other than an advertisement with respect to an invalid click IP address according to a first exemplary embodiment of the present invention.

In operation S301, an invalid click processing system generates the result page with respect to the advertisement exposure request. In operation S301, since the invalid click processing system generates the result page with respect to the advertisement exposure request regardless of the invalid click, the advertisement being an object of the invalid click may be included in the result page in this instance or be excluded from the result page.

In operation S302, the invalid click processing system searches for an IP address of the user terminal transmitting the advertisement exposure request in the invalid click list. Specifically, the invalid click processing system may verify whether the IP address corresponds to the invalid click IP address by searching for the IP address in the invalid click list.

Accordingly, when the IP address of the user terminal is retrieved in the invalid click list in operation S303, the invalid click processing system performs operation S304, when the IP address of the user terminal is not retrieved in the invalid click list, the invalid click processing system performs operation S306. Specifically, the invalid click processing system may verify whether the IP address corresponds to the invalid click IP address and perform different operations based on a result of the verifying.

In operation S304, the invalid click processing system verifies the advertisement being associated with the IP address and being registered when the IP address exists in the invalid click list. Specifically, since the initial invalid click IP address is associated with the corresponding advertisement and is registered in the invalid click list, the advertisement corresponding to the invalid click IP address may be verified when the IP address is determined as the invalid click IP address.

In operation S305, the invalid click processing system excludes the advertisement from the result page and transmits the result page to the user terminal. As described above, the invalid click with respect to the advertisement may be intercepted in advance by excluding the advertisement from the result page with respect to the IP address determined as being the invalid click IP address and transmitting the result page to the user terminal.

Since the result page generated in operation S301 may include or exclude the advertisement, the advertisement may be excluded only when the result page includes the advertisement. For this, the invalid click processing system verifies whether the advertisement exists in the result page, adds a next rank advertisement based on an advertisement exposure rank other than the advertisement to the result page when the advertisement exists, and transmits the result page to the user terminal.

In operation S306, the invalid click processing system transmits the result page to the user terminal. Specifically, when the IP address is different from the invalid click IP address, the invalid click processing system may generate the result page based on the advertisement exposure request received from the user terminal and immediately transmit the result page to the user terminal.

Figure 4:
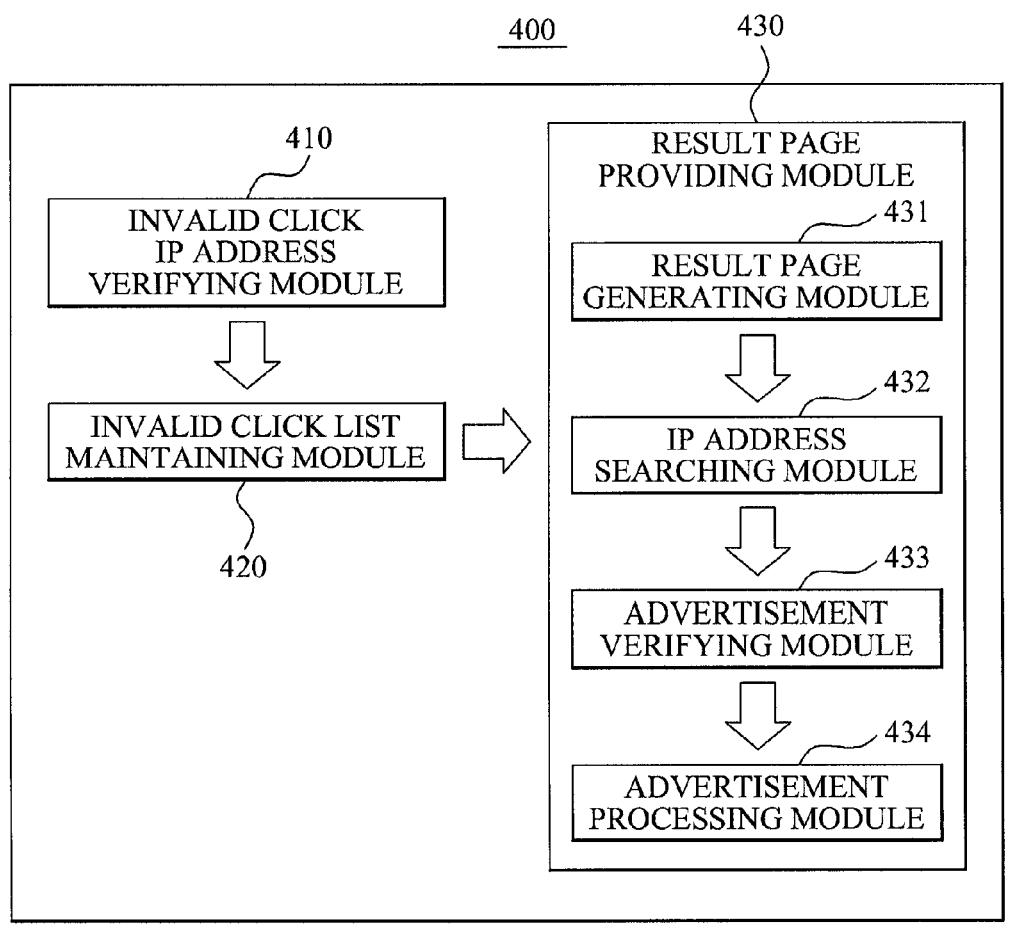
FIG. 4 is a block diagram illustrating an internal configuration of an invalid click processing system according to a second exemplary embodiment of the present invention.

FIG. 4 is a block diagram illustrating an internal configuration of an invalid click processing system 400 according to a second exemplary embodiment of the present invention. As illustrated in FIG. 4, the invalid click processing system 400 includes an invalid click IP address verifying module 410, an invalid click list maintaining module 420, and a result page providing module 430.

The invalid click IP address verifying module 410 verifies an invalid click IP address of a user terminal generating the invalid click with respect to an advertisement. When a number of clicks is greater than or equal to a predetermined number of clicks with respect to the same advertisement using the same IP address over a predetermined time, the invalid click IP address verifying module 410 verifies the same IP address as the invalid click IP address.

The invalid click list maintaining module 420 associates the invalid click IP address with the advertisement, and registers and maintains the invalid click IP address in an invalid click list when the invalid click IP address is verified. This is for intercepting the invalid click with respect to the advertisement in advance by excluding the advertisement when the user terminal using the invalid click IP address subsequently requests exposure of the advertisement, and is described in detail using the result page providing module 430.

The result page providing module 430 provides the user terminal of the invalid click IP address with a result page other than the advertisement with respect to an advertisement exposure request using the invalid click IP address. As illustrated in FIG. 4, the result page providing module 430 may include a result page generating module 431, an IP address searching module 432, an advertisement verifying module 433, and an advertisement processing module 434 in order to provide the result page other than the advertisement.

The result page generating module 431 generates the result page with respect to the advertisement exposure request. Since the result page generating module 431 generates the result page with respect to the advertisement exposure request regardless of the invalid click, the advertisement being an object of the invalid click may be included in the result page in this instance or be excluded from the result page.

The IP address searching module 432 searches for an IP address of the user terminal transmitting the advertisement exposure request in the invalid click list. Specifically, the IP address searching module 432 may verify whether the IP address corresponds to the invalid click IP address by searching for the IP address in the invalid click list. When the IP address of the user terminal is not retrieved in the invalid click list, the IP address searching module 432 may immediately transmit the result page generated by the result page generating module 431 to the user terminal.

The advertisement verifying module 433 verifies the advertisement being associated with the IP address and being registered when the IP address exists in the invalid click list. Specifically, since the initial invalid click IP address is associated with the corresponding advertisement and is registered in the invalid click list, the advertisement corresponding to the invalid click IP address may be verified when the IP address is determined as the invalid click IP address.

The advertisement processing module 434 excludes the advertisement from the result page and transmits the result page to the user terminal. The advertisement processing module 434 may include an advertisement verifying module (not shown) configured to verify whether the advertisement exists in the result page, an advertisement excluding module (not shown) configured to add a next rank advertisement based on an advertisement exposure rank other than the advertisement to the result page when the advertisement exists, and a result page transmitting module (not shown) configured to transmit the result page to the user terminal. Specifically, the advertisement is not exposed to the user terminal of the invalid click IP address.

As described above, when using the method and system of processing the invalid click according to an exemplary embodiment of the present invention, the invalid click may be intercepted in advance by verifying the IP address of the user terminal generating the invalid click with respect to a random advertisement, associating the IP address as the invalid click IP address with the advertisement, and registering and maintaining the IP address, and not exposing the advertisement with respect to the subsequent advertisement exposure request using the invalid click IP address. The result page with respect to the advertisement exposure request may be provided by substituting the advertisement of which exposure is restricted based on the invalid click IP address, with the next rank advertisement based on the advertisement exposure rank.

Figure 5:
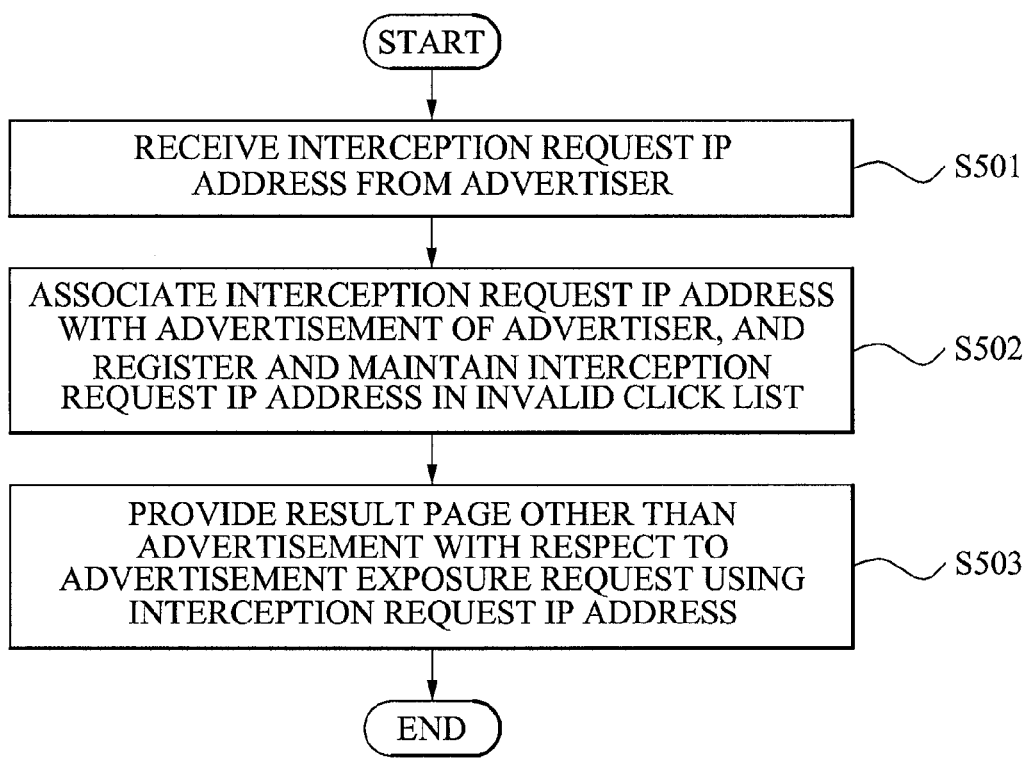
FIG. 5 is a flowchart illustrating a method of processing an invalid click according to a third exemplary embodiment of the present invention.

FIG. 5 is a flowchart illustrating a method of processing an invalid click according to a third exemplary embodiment of the present invention.

In operation S501, an invalid click processing system receives an interception request IP address from an advertiser. Specifically, the advertiser may desire an advertisement of the advertiser with respect to a specific IP not to be exposed, and the invalid click processing system may receive the specific IP as the interception request IP address.

In operation S502, the invalid click processing system associates the interception request IP address with the advertisement of the advertiser, and registers and maintains the interception request IP address in an invalid click list. This is for intercepting the invalid click with respect to the advertisement in advance by excluding the advertisement when a user terminal using the interception request IP address subsequently requests exposure of the advertisement, and is described in detail using operation S503.

In operation S503, the invalid click processing system provides a result page other than the advertisement with respect to an advertisement exposure request using the interception request IP address. The invalid click processing system may generate the result page with respect to the advertisement exposure request, search for an IP address of the user terminal transmitting the advertisement exposure request in the invalid click list, verify the advertisement being associated with the IP address and being registered when the IP address exists in the invalid click list, and exclude the advertisement from the result page and transmit the result page to the user terminal.

The invalid click processing system may verify whether the advertisement exists in the result page in order to exclude the advertisement from the result page, add a next rank advertisement based on an advertisement exposure rank other than the advertisement to the result page when the advertisement exists, and transmit the result page to the user terminal. Accordingly, the advertisement of the advertiser is not exposed to the user terminal corresponding to the interception request IP address.

Figure 6:
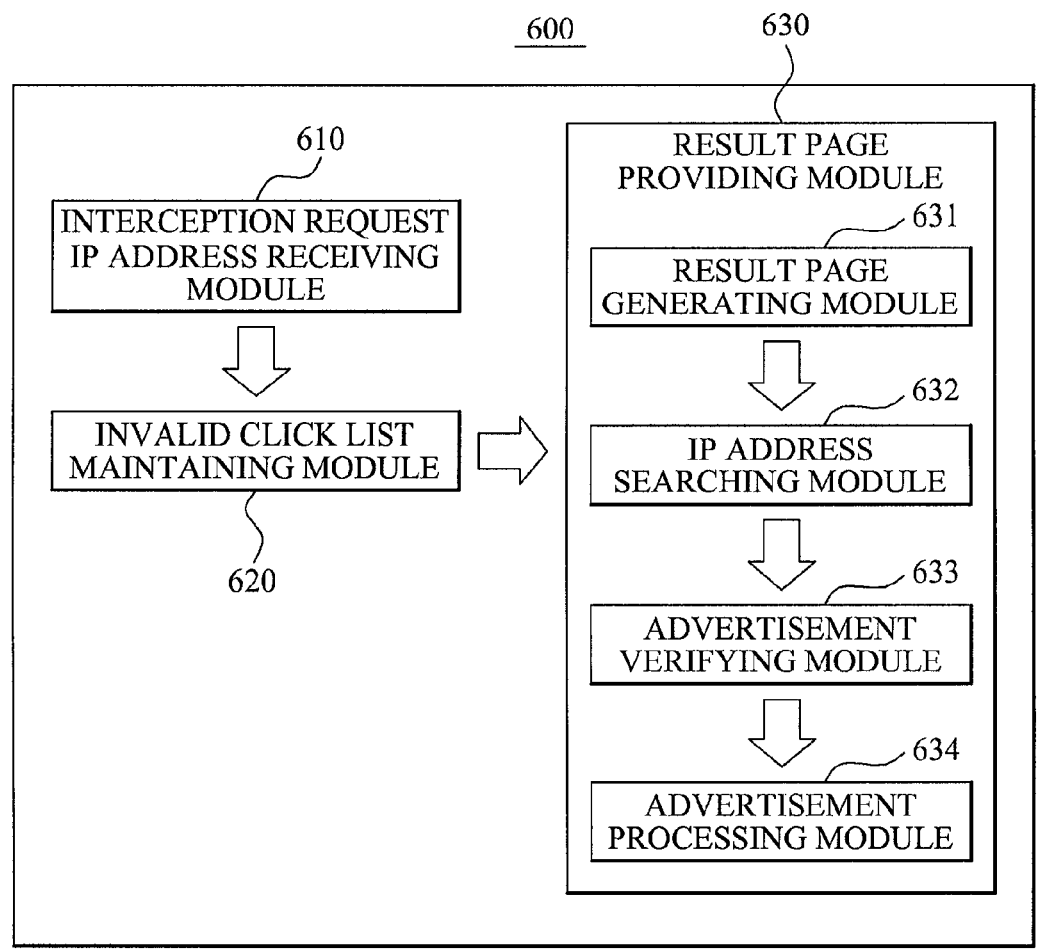
FIG. 6 is a block diagram illustrating an internal configuration of an invalid click processing system according to a fourth exemplary embodiment of the present invention.

FIG. 6 is a block diagram illustrating an internal configuration of an invalid click processing system 600 according to a fourth exemplary embodiment of the present invention. As illustrated in FIG. 6, the invalid click processing system 600 includes an interception request IP address receiving module 610, an invalid click list maintaining module 620, and a result page providing module 630.

The interception request IP address receiving module 610 receives an interception request IP address from an advertiser. Specifically, the advertiser may desire an advertisement of the advertiser with respect to a specific IP not to be exposed, and the interception request IP address receiving module 610 may receive the specific IP as the interception request IP address.

The invalid click list maintaining module 620 associates the interception request IP address with the advertisement of the advertiser, and registers and maintains the interception request IP address in an invalid click list. This is for intercepting the invalid click with respect to the advertisement in advance by excluding the advertisement when a user terminal using the interception request IP address subsequently requests exposure of the advertisement, and is described in detail using the result page providing module 630.

The result page providing module 630 provides a result page other than the advertisement with respect to an advertisement exposure request using the interception request IP address. As illustrated in FIG. 6, the result page providing module 630 may include a result page generating module 631 configured to generate the result page with respect to the advertisement exposure request, an IP address searching module 632 configured to search for an IP address of the user terminal transmitting the advertisement exposure request in the invalid click list, an advertisement verifying module 633 configured to verify the advertisement being associated with the IP address and being registered when the IP address exists in the invalid click list, and an advertisement processing module 634 configured to exclude the advertisement from the result page and to transmit the result page to the user terminal.

The advertisement processing module 634 may verify whether the advertisement exists in the result page in order to exclude the advertisement from the result page, add a next rank advertisement based on an advertisement exposure rank other than the advertisement to the result page when the advertisement exists, and transmit the result page to the user terminal. Accordingly, the advertisement of the advertiser is not exposed to the user terminal corresponding to the interception request IP address.

As described above, when using the method and system of processing the invalid click according to an exemplary embodiment of the present invention, the invalid click may be intercepted by associating the interception request IP address inputted from the advertiser with the advertisement of the advertiser, and registering and maintaining the interception request IP address, and not exposing the advertisement with respect to the advertisement exposure request using the interception request IP address. The result page with respect to the advertisement exposure request may be provided by substituting the advertisement of which exposure is restricted based on the interception request IP address, with the next rank advertisement based on the advertisement exposure rank.

The exemplary embodiments according to the present invention may be recorded in computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of computer-readable media include magnetic media such as hard disks, floppy disks, and magnetic tape; optical media such as CD ROM disks and DVD; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

According to the present invention, it is possible to intercept an invalid click in advance by verifying an IP address of a user terminal generating the invalid click with respect to a random advertisement, associating the IP address as an invalid click IP address with the advertisement, registering and maintaining the IP address, and not exposing the advertisement with respect to a subsequent advertisement exposure request using the invalid click IP address.

Also, according to the present invention, it is possible to intercept the invalid click by associating an interception request IP address inputted from an advertiser with an advertisement of the advertiser, registering and maintaining the interception request IP address, and not exposing the advertisement with respect to an advertisement exposure request using the interception request IP address.

Also, according to the present invention, it is possible to provide a result page with respect to an advertisement exposure request by substituting an advertisement of which exposure is restricted based on either an invalid click IP address or an interception request IP address, with a next rank advertisement based on an advertisement exposure rank.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A method of processing an invalid click, the method comprising:

verifying, using a processor, an invalid click Internet Protocol (IP) address of a user terminal generating the invalid click with respect to an advertisement;

associating, using a processor, the invalid click IP address with the advertisement, and registering and maintaining the invalid click IP address in an invalid click list in response to the verification of the invalid click IP address; and selectively providing, using a processor, the user terminal verified as generating the invalid click IP address with a result page without providing the advertisement;

wherein providing the user terminal with the result page without providing the advertisement comprises:

generating the result page with respect to the advertisement exposure request;

searching for an IP address of the user terminal transmitting the advertisement exposure request;

verifying the advertisement associated with the IP address being registered in response to determination that the IP address exists in the invalid click list; and substituting, using the processor, the advertisement from the result page with a next ranked advertisement based on an advertising exposure rank, and transmitting the result page to the user terminal.

2. The method of claim 1, wherein, when a number of clicks is greater than or equal to a first number of clicks with respect to the same advertisement using the same IP address over a first time, the step of verifying verifies the same IP address as the invalid click IP address.

3. A method of processing an invalid click, the method comprising:

receiving, using a process, an interception request Internet Prot Protocol (IP) address from an advertiser;

associating, using a processor, the interception request IP address with an advertisement of the advertiser, and registering and maintaining the interception request IP address in an invalid click list; and selectively providing, using a processor, a result page without providing the advertisement;

wherein providing the result page without providing the advertisement comprises:

generating the result page with respect to the advertisement exposure request;

searching for an IP address of a user terminal transmitting the advertisement exposure request;

verifying the advertisement associated with the IP address being registered in response to determination that the IP address exists in the invalid click list; and substituting, using the processor, the advertisement from the result page with a next ranked advertisement based on an advertisement exposure rank and transmitting the result page to the user terminal.

4. A non-transitory computer-useable medium having computer readable instructions stored thereon for execution by a processor to perform a method for processing an invalid click, comprising:

verifying an in click Internet Protocol (IP) address of a user terminal generating invalid click with respect to an advertisement;

associating the invalid click IP address with the advertisement, and registering and maintaining the invalid click IP address in an invalid click list when the invalid click IP address is verified; and selectively providing the user terminal of the invalid click IP address with a result page without providing the advertisement;

wherein providing the user terminal of the invalid click IP address with the result page without providing the advertisement comprises:

generating the result page with respect to the advertisement exposure request;

searching for an IP address of the user terminal transmitting the advertisement exposure request;

verifying the advertisement associated with the IP address being registered in response to determination that the IP address exists in the invalid click list; and substituting the advertisement from the result page with a next ranked advertisement based on an advertising exposure rank, and transmitting the result page to the user terminal.

5. An invalid click processing system to intercept an invalid click, comprising:

a processor;

a storage unit for storing instruction modules adapted to be de execute by the processor;

the instructions modules including, an valid click Internet Protocol (IP) address verifying module to verify an invalid IP address of a user terminal generating the invalid click with respect to an advertisement;

an invalid click list maintaining module to associate the invalid click IP address with the advertisement, and to register and maintain the invalid click IP address in an invalid click list when the invalid click IP address is verified; and a result page providing module to selectively provide the user terminal of the invalid click IP address with a result page without the advertisement;

wherein the result page providing module comprises;

a result page generating module to generate the result page with respect to the advertisement exposure request;

an IP address searching module to search for an IP address of the user terminal transmitting the advertisement exposure request;

an advertisement verifying module to verify the advertisement associated with the IP address in response to detection of the IP address in the invalid click list; and an advertisement processing module to substitute the advertisement from the result page with a next ranked advertisement based on an advertising exposure rank, and to transmit the result page to the user terminal.

6. The invalid click processing system of claim 5, wherein, when a number of clicks is greater than or equal to a first number of clicks with respect to the same advertisement using the same IP address over a first time, the invalid click IP address verifying module verifies the same IP address as the invalid click IP address.

7. An invalid click processing system to intercept an invalid click, comprising:

one or core modules being configured and executed by at least one processor using program in a storage device, the one or r ore modules comprising;

an interception request Internet Protocol (IP) address receiving module to receive an interception request IP address from an advertiser;

an invalid click list maintaining module to associate the interception request IP address with an advertisement of the advertiser, and to register and maintain the interception request IP address in an invalid click list; and a result page providing module to selectively provide a result page without the advertisement;

wherein the result page providing module comprises:

a result page generating module to generate the result page with respect to the advertisement exposure request;

an IP address searching module to search for IP address of a user terminal transmitting the advertisement exposure request;

an advertisement verifying module to verify the advertisement associated with the IP address in response to detection of the IP address in the invalid click list; and an advertisement processing module to substitute the advertisement from the result page with a next ranked advertisement based on an advertisement exposure rank and to transmit the result page to the user terminal.

* * * * *